United States Patent [19]

Grabowski

[11] Patent Number: 4,676,892
[45] Date of Patent: Jun. 30, 1987

[54] HOLLOW REACTOR FOR BIOLOGICAL WASTE-WATER PURIFICATION

[75] Inventor: Gunther Grabowski, Langgöns, Fed. Rep. of Germany

[73] Assignee: Grabowski Tropfkorper-Technik GmbH, Fed. Rep. of Germany

[21] Appl. No.: 852,817

[22] Filed: Apr. 16, 1986

[30] Foreign Application Priority Data

Apr. 16, 1985 [DE] Fed. Rep. of Germany ....... 3513602

[51] Int. Cl.⁴ ............................................. C02F 3/08
[52] U.S. Cl. ..................................... 210/150; 261/92; 210/619
[58] Field of Search ....................... 210/150, 151, 619; 261/92, 93

[56] References Cited

U.S. PATENT DOCUMENTS

| 4,267,051 | 5/1981 | Uhlmann | 210/150 |
| 4,284,503 | 8/1981 | Stähler | 210/150 |
| 4,318,810 | 3/1982 | Stähler | 210/150 |
| 4,351,721 | 9/1982 | Frandsen | 210/150 |
| 4,540,491 | 9/1985 | Zimmer | 210/619 |

FOREIGN PATENT DOCUMENTS

| 2849013 | 5/1979 | Fed. Rep. of Germany | 210/150 |
| 3409111 | 9/1985 | Fed. Rep. of Germany | 210/150 |
| 54-6357 | 1/1979 | Japan | 210/150 |

Primary Examiner—Benoit Castel
Attorney, Agent, or Firm—Wegner & Bretschneider

[57] ABSTRACT

Simple and inexpensive hollow reactors in the form of spirals of corrugated plastic tubes, which are coiled in the same direction and clamped in large numbers adjacent to each other in a drum-like cage for use in biological waste water purification. This drum-like cage is mounted so that it can rotate in a waste-water-filled tank, in such a way that only the outer spiral turns project above the water level. During rotation in the opposite direction, each emerging tube end admits air, which on further rotation is trapped as a bubble in the spiral and is transported because of its inertia to the underwater spiral end. In this process the liquid contained in front of it in the tube is displaced and an equal volume is admitted at the inlet opening from the surrounding waste water. The air emerging from the inner spiral end rises upwards in individual bubbles between the spiral reactors. While part of the emerging waste water is entrained by the suction effect of the bubbles, the other part can flow away out of the laterally open inside space.

2 Claims, 2 Drawing Figures

HOLLOW REACTOR FOR BIOLOGICAL WASTE-WATER PURIFICATION

BACKGROUND OF THE INVENTION

This invention relates to a hollow reactor, permitting the growth of sessile microorganisms, for biological waste water purification.

Various media configurations, designed for the conditions of the particular processing technology such as trickling filters, immersed reactors or fixed beds in activated-sludge plants, are used for growing sessile micro-organisms in biological waste-water purification plants. The media configurations in immersed-reactor plants have to perform an extensive function, since not only must they provide the largest possible growth surfaces while preventing clogging of the cavities, but also they have to assure the oxygen and nutrient transport to the fixed biomass as well as sufficient circulation of the waste water. Simple immersed-reactor systems can satisfy these requirements only approximately with very low loading capabilities, meaning a large and expensive plant volume, whereas systems with better output capabilities necessitate a greater expenditure on technical equipment as well as greater power consumption.

The influence of the sessile microorganisms on the particular purification process is characterized by the ratio of volume of medium to waste-water volume contained in the reactor:

| | |
|---|---|
| Trickling filters | ca. 100:1 |
| Immersed-reactor systems | 0.8-2.0:1 |
| Activation-with fixed beds | ca. 0.2:1 |

The rotationally symmetric mechanisms used in the immersed-reactor process must assure within the system the supply of oxygen and nutrients as well as adequate mixing. In simple form, disks mounted in parallel on a shaft and immersed in waste water to at most the hub center rotate in a semicylindrical trough. To improve the oxygen supply and waste-water mixing, immersed reactors are known whose growth media consist of spiral or helical coils. the helical immersed reactors include the immersed reactors known by the designations of immersed coil and biospiral. In the case of the immersed coil, tubes are coiled in layers onto a shaft in the longitudinal direction, so that there is always a constant distance between the axis of a given tube and the drum axis. In the case of the biospiral, a surface resembling a horizontal worm conveyor with large outside diameter and small pitch is attached helically to a shaft. If the helical immersed reactors, whose central axis is mounted in the vicinity of the water level line, are made to rotate, slight transport of the waste water, corresponding to the low speed of rotation, takes place in the direction of the longitudinal axis.

The disk-type and helical immersed reactors operate without pressure, and only around half of their total surface area is in contact with the waste water. In one immersed reactor which has been disclosed as a coiled reactor, both a trapezoidal film and smooth film are coiled together on a shaft, thus forming a spiral reactor with lateral holes. During rotation of the immersed reactor, whose axis is also located in the vicinity of the water level line, the waste water on emergence drains to one side and on immersion forces the air to the other side, because of the trapezoidal channels running helically with respect to the central axis. For the part of the coiled reactor below the water level line, only a minor through flow is to be expected, and this is brought to a stop by fairly intensive biological growth.

A hollow reactor formed from two tubular spirals coiled in opposite directions has been disclosed by U.S. Pat. No. 4,351,721. The characterizing features presented are that the two inner tube ends of the double spiral are connected together, and the axis of the spiral-tube reactor is mounted so far above the water level that the outer tube end of one spiral pointing against the direction of rotation dips into the waste water and scoops in a small volume of waste water. During further rotation, the scooped-in volume of waste water rises through the spiral and passes via a horizontal connecting piece into the opposite tubular spiral, so that it is transported down again. The alleged advantage of the double spiral immersed only slightly in the waste water is expressly stated: constant alternating flushing and aeration of the waste water inside the tubes, as well as significant energy savings due to torque compensation by virtue of the opposite directions of the interconnected double spiral. In contrast to the good aeration of the waste water inside the tube, there is the disadvantage that only an extremely small volume of waste water can be brought into contact with the biological growth for a relatively short time. The outside surfaces of the tubular spiral, except for the outer spiral turn, do not come into contact with waste water at all. Thus the technical designation of "immersed reactor" cannot even be applied to this device (see ATV (allgemeine technische Vorschriften) sheet A 135). The major effect of the torque relief achieved by the opposing coupled tubular spirals is merely an energy savings. Since the major part of the apparatus is outside the water, enormous bearing pressures occur, resulting in a greater power requirement for the drive of the device. The specific power consumption, expressed in W/m$^2$ of installed area of the medium, is 0.92 W/m$^2$ on the basis of the information presented.

An immersed reactor, which is largely immersed in the waste water and thus creates favorable prerequisites for the largest possible area of contact between fixed biomass and surrounding waste water, has been disclosed in West German Offenlegungsschrift No. 33 24 853. The immersed reactor, which essentially consists of a perforated drum in which the packing material is contained, is shaped on its outside such that, at sufficient speed of rotation, air bubbles are entrained into the waste-water tank and an oxygen-rich waste water is produced in the vicinity of the immersed reactor. This apparatus is therefore primarily an aerating system with a immersed-reactor component connected in series. Despite the high speed of drum revolution needed to entrain oxygen, controlling waste water exchange in the packed inside of the drum is not assured.

Cellular-wheel immersed reactors with segment-like pockets have the property of taking up surrounding air and releasing it again at a specified position under water. These cellular wheels operate on the reverse of the bucket-wheel principle. Since the air trapped in the pockets is released only below the wheel axis, even reactor surfaces which do not emerge from the waste water can be supplied with oxygen. In this design approximately ⅔ of the diameter of the immersed reactor projects into the waste water. Another design has a single pocket whose circumference is trumpet-shaped and which, on emergence, takes up a large air volume and as rotation continues compresses the air so strongly that the air at the other end already escapes when this end is at its lowest point. To be able to generate this high pressure, however, only half the wheel must be immersed in the waste water. The drive of such immersed reactors which trap and release air below the water line requires a relatively high power consumption, since the trapped air is kept at the periphery of the wheel for ¼ of one revolution.

The structural design of cellular wheels and the surface shaping of immersed disks to increase the area available to biological growth result in high manufacturing costs and expensive assembly operations. From the viewpoint of process engineering, the known immersed reactors suffer from the defect of nonuniform surface coverage (sludge load per unit area per unit time), since no measurable waste-water exchange occurs within the tank housing the immersed reactor and in the cavities and interstices of the immersed reactors themselves, and since the flow to the reactor surfaces covered with microorganisms is very variable.

SUMMARY OF THE INVENTION

The primary object of the present invention is to provide a hollow reactor which permits the growth of sessile microorganisms and whose surfaces, formed by simple hollow elements, are almost completely immersed, and in which the microorganisms adhering to the surface are supplied as well as possible by uniform waste-water exchange and intermittent air supply.

Consistent with the foregoing object, there is provided a hollow reactor, permitting the growth of sessile microorganisms, for biological waste-water purification, consisting of a large number of tubular spirals which, located, adjacent to each other and coiled in the same direction, are clamped in a drum-like rotary cage, which is immersed in a waste-water-filled tank such that only the outer turns of the spiral emerge above the water line of the waste-water. During rotation in a direction opposite to the coiling direction of the tubular spirals, the emerging end of each tubular admits air, which during further rotation is trapped in the upper bend of the tube as a bubble in the waste water because of reimmersion. The inertia imposed by buoyant force on the air bubble in the upper crown region of the tubular arch moves the air bubble down toward the spiral center during continued rotation of the spiral. At the end of the last spiral turn the air bubble emerges and rises upwards again outside the spiral. Since in this process the liquid contained in the tube is displaced by the air bubble or sucked along behind the air bubble, a continuous flow of waste water through the tubular spiral is produced, and this flow supplies the biomass adhering to the tube walls with nutrients from the waste water.

BRIEF DESCRIPTION OF DRAWINGS

The invention will be better understood, and objects other than those set forth above, will become apparent, when consideration is given to the following detailed description thereof. Such description makes reference to the annexed drawing wherein.

DETAILED DESCRIPTION OF THE PREFERRED EMBODIMENT

Figure 1:
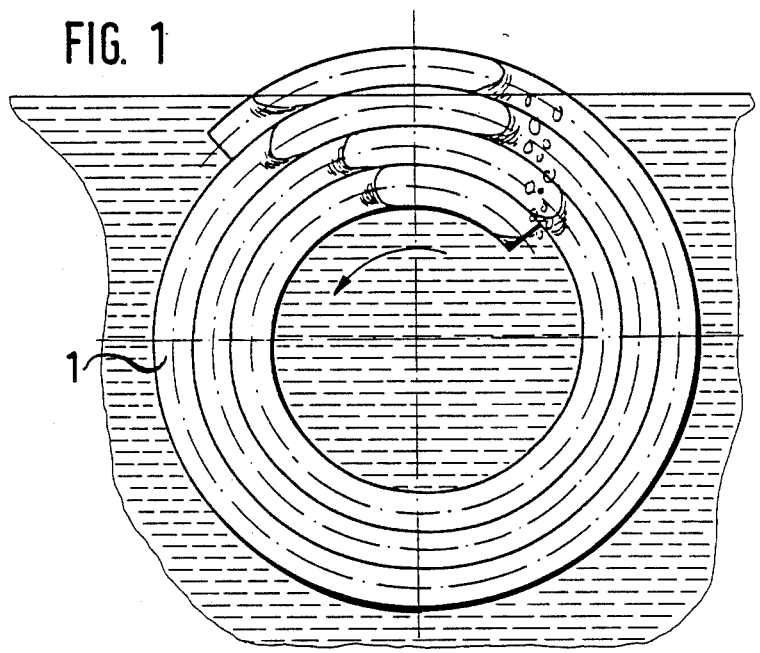
FIG. 1 shows an individual tubular-spiral reactor (1), whose outer spiral turn extends above the indicated water level line.
Figure 2:
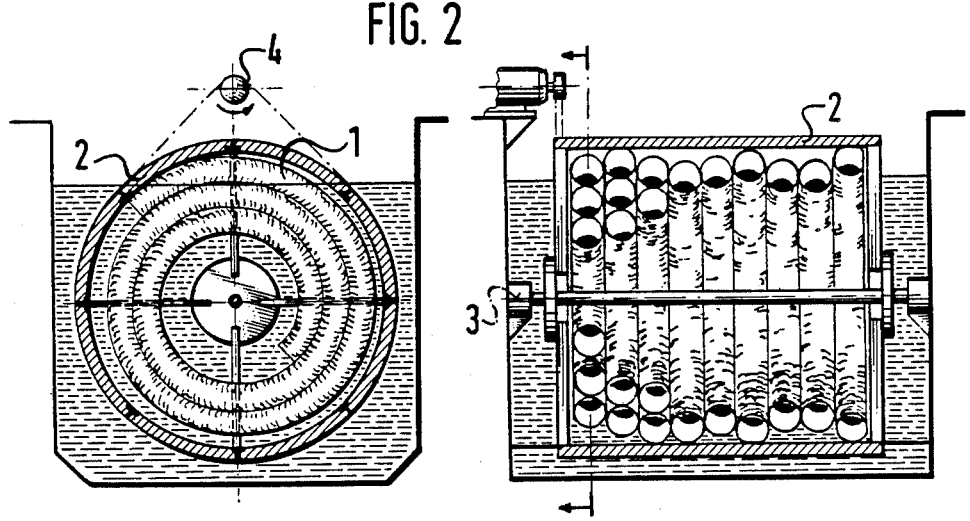
FIG. 2 shows front and side elevational views, partly in section, of a drum-like cage with several clamped spiral-tube reactors.

This invention provides for the use of simple and inexpensive hollow reactors in the form of spirals 1 of corrugated plastic tubes, which are coiled in the same direction and clamped in large numbers adjacent to each other in a drum-like cage 2. This drum-like cage 2 consisting of a sectional-steel structure is mounted so that it can rotate on an axis 3 in a waste-water-filled tank, in such a way that only the outer turns of the spiral project above the water level. The drum is driven by means 4 which can comprise any conventional drive means such as a motor and an endless belt or chain. During rotation in the opposite direction, each emerging tube end admits air, which on further rotation is trapped as a bubble in the spiral and is transported because of its inertia to the underwater spiral end. In this process the liquid contained in front of it in the tube is displaced and an equal volume is admitted at the inlet opening from the surrounding waste water. The air emerging from the inner spiral end rises upwards in individual bubbles between the spiral reactors. While part of the emerging waste water is entrained by the suction effect of the bubbles, the other part can flow away out of the laterally open inside space.

The torque necessary to drive the drum results from the sum of the bubble buoyant forces and their slight deflections from the vertical center line of the spiral. The hollow reactor of the invention assures not only continuous contact between the sessile microorganisms and the waste water with forced and uniform interface renewal, but also high utilization of the oxygen in the air introduced into the waste water, all for the lowest power consumption.

By virtue of the invention, the energy expenditure necessary for air transport to the underwater reactor surfaces is intended to be reduced relative to that of conventional devices, and the economy of using immersed reactors is intended to be improved by employing technically simple semi-finished components which are inexpensive because of mass production.

The object is achieved in that a large number of adjacent spiral tubular reactors, which are coiled in the same direction, are clamped in a drum-like cage, which is mounted in such a way in a waste-water-filled tank that only around 1/20 to 1/10 of the drum diameter projects above the water level, as a result of which air can flow into the outer tube ends during rotation in the opposite direction. when the tube ends are reimmersed under the water surface, a certain air volume is trapped in each tubular spiral, and on further rotation of the drum this air is forced under water until it can emerge again at the inner tube end.

Despite its simple design, a hollow reactor fabricated in accordance with the invention meets the requirements imposed on immersed reactors to an excellent degree. Both waste water and air are forced in uniform succession past the microorganisms attached to the inside surfaces of the tubes. The air volume trapped in the outer spiral turn during one revolution is forced in slightly compressed form out of the inner end of the tubular spiral, while the water volume located between two air bubbles in the innermost spiral turn corresponds to the water volume admitted per revolution in the outer spiral turn. The air bubbles emerging from the inner tube end rise back upwards in the spaces between the individual tubular spirals. This process is facilitated by using shaped corrugated tubes for the tubular spirals, thus preventing the formation of spaces in the form of closed channels between the tubes. Since the rising air bubbles cause waste-water exchange between the tubes, the outside tube walls are also completely available for growth of microorganisms. Thus all surfaces of the hollow reactor are utilized under largely uniform loading conditions. Part of the purified waste water flowing out of the inner tube end can flow away in the axial direction through the unoccupied inside space. The energy consumption for rotation of the drum is determined by the buoyancy force of the trapped air bubbles and their deflection from the vertical center line of the spiral. The torques are greatly reduced by different displacements to the left and right of the central verticals. However, the residual torque due to off-center trapped bubbles is not greater than that due to the weight of the water volume raised above the water level in the outer spiral turn and the horizontal distance of its center of gravity from the vertical center line of the spiral. Since this water volume corresponds to only a fraction of the total air volume trapped in the spiral, and since the distance of the center of gravity is smaller than half the drum radius, the hollow reactor of the invention requires a very low torque. According to the present studies the specific power consumption is less than 0.1 Watt per square meter of installed bacteria-containing surface and is therefore well below the values of conventional immersed-reactor systems.

In a further embodiment, multiturn tubular spirals can be installed adjacent to each other on one drum, thus shortening the residence time of waste water and air bubbles in the tubular reactor and increasing the exchange frequency for the same drum diameter and same speed of rotation.

Another embodiment is the loose array of tubular spirals on one drum, wherein a fairly large space is maintained between the tubular spirals by suitable spacers. When used in a tank with forced circulation of the waste water, a hollow reactor with this type of structure impedes the directional water flow only slightly.

A special advantage of the invention is to be seen in the fact that, in the purification of mechanically pre-cleaned waste water, the hollow reactor cannot become blocked or locally clogged with sludge, since the tubular channel always has the same cross section and since waste water and air are always passed through at uniform pressure. Even in the outer spaces between the tubular spirals, the turbulence produced by rising air bubbles prevents sludge deposition. Thus the hollow reactor is suitable preferably for use in sludge-containing waste water, e.g., in activated-sludge plants or waste-water ponds aerated with compressed air.

What is claimed is:

1. A hollow reactor for permitting the growth of sessile microorganisms in biological waste-water purification, comprising:
   (A) a plurality of adjacent tubular spirals that are coiled in the same direction, each spiral having an outer turn;
   (B) a drum-like rotary cage;
   (C) a waste-water filled tank; and
   (D) a drive mechanism for rotating said rotary cage;
   (E) wherein the spirals are clamped in the rotary cage and the rotary cage is immersed in the tank such that only the outer turn of each spiral emerges above the water line of the waste-water.

2. The hollow reactor according to claim 1 wherein the tubular spirals are formed from multi-turn coils.

* * * * *